United States Patent Office 3,551,402
Patented Dec. 29, 1970

3,551,402
HALOGENATION OF LIQUID POLYMERS
Douglas C. Edwards, Sarnia, Ontario, and Richard H. Wunder, Corunna, Ontario, Canada, assignors to Polymer Corporation Limited, Sarnia, Ontario, Canada, a body corporate and body politic
No Drawing. Filed Dec. 12, 1968, Ser. No. 783,398
Claims priority, application Canada, Jan. 15, 1968, 9,841
Int. Cl. C08d 5/04; C08f 27/03, 27/08
U.S. Cl. 260—94.7
10 Claims

ABSTRACT OF THE DISCLOSURE

A liquid polymer of a conjugated alkadiene containing molecules with more than one allyl hydroxyl group is halogenated with hydrogen halide to produce a halogenated polymer in which allyl hydroxyl groups are replaced by allyl halide groups.

---

The halogenated polymer is vulcanizable with polyamines, especially tertiary aliphatic polyamines containing more than two amine nitrogen atoms to produce solid rubber vulcanizate.

This invention relates to low molecular weight halogenated polymers. More particularly, it relates to the production of liquid polymers of conjugated alkadiene having allylic halide groups.

Liquid polymers of alkadiene hydrocarbons having molecules with two separated allylic halide groups within their molecular structures are described in U.S. application Ser. No. 727,039. They are produced by polymerizing a conjugated alkadiene in an aqueous emulsion in the presence of polyhalogen chain transfer agents. The liquid polymer so produced is contaminated with residues of the chain transfer agents and emulsifier and a tedious purification procedure is required to recover a liquid terminally reactive polymer capable of vulcanizing to elastic products with moderate amounts of polyamines.

An object of this invention is to provide a new method of producing liquid polymers having allylic halide groups. Another object is to produce such liquid polymers in a relatively pure form.

The present invention provides a process of producing an amine-vulcanizable polymer of a conjugated alkadiene which comprises halogenating a liquid polyunsaturated polymer of a conjugated alkadiene with a hydrogen halide, said polymer containing molecules with more than one allyl hydroxyl group, and recovering a halogenated liquid polyunsaturated polymer containing molecules with more than one allyl halide group.

The polymer used in the process of this invention preferably is a hydroxylated polymer of a conjugated alkadiene. It is liquid and pourable at a temperature between 0° C. and 50° C. and has an average molecular weight in the order of about 1,000 to about 20,000. It essentially consists of long chain molecules of linked-up hydrocarbon units of one or more polymerized conjugated alkadienes such as butadiene-1,3, isoprene, 2,3-dimethyl butadiene-1,3, 2-phenyl butadiene-1,3, pentadiene-1,3 with or without polymerized units of monoolefins, for example, ethylene, propylene, butene, cyclopentene, styrene and alpha methyl styrene. The units of conjugated alkadienes preferably range from more than 50 mole percent to 100%, and the polymer used in this process preferably has an iodine number ranging from about 200 to about 450. The polymer may also contain a small proportion, for example, less than 30 mole percent of non-hydrocarbon units, for example, units derived fro acrylonitrile, methacrylonitrile, vinyl pyridine, ethyl acrylate, vinyl esters such as vinyl acetate, vinyl ketones such as ethyl vinyl ketone and vinyl ethers such as ethyl vinyl ether. The polymer molecules may be either linear or branched; depending on the number of branches, they have 2 or more terminal groups, a substantial number of which are allyl hydroxyl groups. Molecules with more than one allyl hydroxyl group must be present. It is preferred that the majority of polymeric molecules of said polymer have at least two terminal allyl hydroxyl groups. Three or more terminal allyl hydroxyl groups may be present in a branched molecule provided the branching and the hydroxyl groups do not significantly affect pourability and solubility of the polymer.

The terminally hydroxylated polymers that can be used in this invention are known in the art. They may be produced from hydrocarbon or essentially hydrocarbon monomers by polymerization in an organic medium using a peroxy initiator such as hydrogen peroxide at elevated temperatures. Hydroxylated polymers prepared from metallated polymers such as dilithium polybutadiene, which do not have allyl hydroxyl groups, are of little use in the process of this invention.

In accordance with this invention, the hydroxylated polymer is treated with a hydrogen halide selected from hydrogen chloride, hydrogen bromide and hydrogen iodide. Hydrogen bromide is preferred as it is more reactive than hydrogen chloride and produces halogenated products which are free of gel and essentially as liquid as the starting material. The treatment is carried out preferably under substantially anaerobic conditions and preferably in the absence of water. The small amount of water that is formed in the reaction between the hydroxyl groups and hydrogen halide is not harmful. Larger amounts of water, however, should be avoided; they dissolve hydrogen halide and reduce its activity in this process. It is preferred to use dry, i.e. gaseous hydrogen halide such as HCl or HBr at pressures of not above 3 atmospheres. Higher pressures result in undesired side reactions. The temperature of the halogenation may vary within wide limits ranging from 0° C. to about 120° C. although the range between 20° C. and about 90° C. is preferred. The substitution of hydroxyl groups by halogens in the terminal allyl hydroxyl groups proceeds rapidly in comparison to other halogenation reactions; at room temperature it is essentially complete in a few hours, and at a temperature of about 90° C. in less than one hour. Prolonging the reaction time in the presence of excess hydrogen halide beyond the point of complete hydroxyl substitution does not significantly change the product provided its unsaturation is not unduly reduced, e.g. to an iodine number less than 200; the halogen content slowly increases due to the addition of halogen halide to the carbon-to-carbon double bonds whereby relatively non-reactive halide groups are formed which are separated from centers of unsaturation by more than three carbon atoms. When hydrogen chloride is used as the halogenating agent, it is preferred to use it in excess of the stoichiometric amount and stop the reaction as soon as the complete substitution is achieved. However, a complete substitution is not essential for the production of an amine-vulcanizable polymer. When the starting polymer is rich in allyl hydroxyl groups, it is sufficient to partially halogenate the hydroxylated polymer so as to produce polymer molecules with more than one allyl halide group.

The degree of halogenation is controlled by the time and the temperature at which the reaction is carried out as well as by the amount of hydrogen halide employed. This amount of hydrogen halide may vary between about 4% and about 30% by weight of the polymer. When hydrogen bromide is used, the preferred amount is from not less than 5% to about 15% by weight.

When the desired degree of halogenation is reached, the reaction is stopped by removing the excess of hydrogen halide. It may be removed by degassing of gaseous halides or by washing of the reaction mixture with water or acetone until it is free of halogen ions. The polymer is then dried or devolatilized to produce a clear viscous liquid.

The amount of bound halogen in the halogenated product may vary from more than one allylic halogen per molecule to more than three. It is preferred that the majority of molecules in the halogenated liquid polymer contain at least two allylic halogen atoms. On weight basis, the amount of bound halogen obviously depends on the molecular weight of the polymer and the type of halogen atom. In general, it may vary from 0.5% by weight to about 22% by weight, although the preferred amount is from more than 2% to about 8% by weight. For example, a chlorinated liquid polymer may contain between about 0.5 and about 7% by weight of halogen although the range between more than 2 and 5 is preferred. In brominated polymer, the amount of halogen may range from about 0.5 to about 15% by weight with the particularly satisfactory range being from about 4 to about 8%. The corresponding range for the iodinated polymer is by about 50% higher than for the brominated polymer.

The viscosity of the halogenated product is the same as or somewhat increased over the viscosity of the starting material. The product preferably is fluid and pourable at a temperature of 0–50° C., although polymers having a consistency of petroleum jelly are also useful.

The halogenated liquid polymer of this invention contains allylic halide groups in a relatively small amount just sufficient to make it cold curable with polyamines, that is, curable at about 25° C. to solid and preferably rubbery products. The polymer may contain also other halide groups such as halogenated alkyl groups and halide groups produced by addition reaction of hydrogen halide with double bonds of the polymer, but these other groups are relatively non-reactive with amines and non-functional under the conditions of low temperature vulcanization.

The presence of allyl halide groups in the halogenated liquid polymer is judged by the reaction of the polymer with tertiary aliphatic amines and in particular with polyamines such as methylated triethylene tetramine. This reaction also provides means for the determination of polymeric molecules with more than one allylic halide group in their structure. Thus, for example, polymers which are free of allyl halide groups do not react at room temperature with the above tetramine; they remain liquid and unvulcanized. Similarly, polymers having not more than one allyl halide group per molecule do not vulcanize; they merely show an increase in viscosity but the products which may be solid and relatively firm remain hydrocarbon soluble. The increase in viscosity is due to coupling of at least two molecules containing single allyl halide groups by means of polyfunctional tetramine. On the other hand, the halogenated liquid polymer containing molecules with more than one allyl halide group, for example, two or three or even more allyl halide groups, preferably in terminal positions, react with the polyamine to form a cross-linked three-dimensional polymeric structure, i.e. a vulcanizate having properties similar to vulcanizates prepared from high molecular solid polymers. As the proportion of molecules with more than one allyl halide group increases, the vulcanizability of the halogenated polymer is increased and the physical properties of the vulcanized product are improved. For good physical properties, it is preferred to use a halogenated liquid polymer in which a major proportion of molecules have at least two allyl halide groups in terminal positions. There is no qualitative difference between molecules containing two allyl halide groups and those with three or more groups; they all are capable of producing an insoluble vulcanizate.

The polyamines that can be used for vulcanization of halogenated polymers of this invention are the same as described in U.S. application Ser. No. 727,039 filed May 6, 1968 and/or in copending applications Nos. 616,777, 685,955 and 714,017. The polymers of this invention may be compounded with polymeric materials, fillers, plasticizers and other conventional compounding materials, as described in the above patent specifications, as may be desired for specific applications.

The following examples will further illustrate the invention.

EXAMPLE I

A hydroxylated polybutadiene, prepared by hydrogen peroxide catalyzed polymerization in a homogeneous one-phase system at an elevated temperature of about 120° C., was chlorinated with hydrogen chloride in a series of 30 oz. bottle experiments.

The polybutadiene was a viscous liquid having a bulk viscosity of 220 poises measured at 25° C. using a Brookfield viscometer and was characterized by a hydroxyl content of 0.75 milliequivalent per gram, an iodine number of 395 and an average molecular weight of about 3500. 25 grams of this polymer was added to a 30 oz. pressure bottle along with 25 grams of n-hexane. The bottle was then capped and pressurized with 30 p.s.i. (2.1 atmospheres) of gaseous hydrogen chloride. An average of 6.5–7.0 grams of HCl was added per bottle. Some bottles were evacuated before the addition of HCl to remove air oxygen. The bottles were then shaken at room temperature and the reaction between HCl and the hydroxylated polymer was allowed to proceed for various times. Next the bottles were opened and 0.32 gram of an alkylated bis-phenol antioxidant was mixed into the polymer mixture. The mixture was then transferred to a Waring Blendor and washed with an aqueous solution of acetone containing 33 volume percent of acetone until the mixture was free of chloride ions. The washed polymer solution was separated from the aqueous wash medium and devolatilized by distilling of hexane and acetone residues.

Details of the bottle experiments with respect to reaction conditions and properties of the chlorinated polymers are presented in Table I. Included in the table is a control experiment on a liquid non-hydroxylated polybutadiene, prepared in bulk at 60° C. using benzoyl peroxide as the initiator. The viscosity of this control polymer was 420 poises at 25° C.

TABLE I

| Bottle No | 1 | 2 | 3 | 4 | Control [1] |
|---|---|---|---|---|---|
| Polybutadiene type | (²) | (²) | (²) | (³) | (³) |
| Reaction time (hrs.) at 25° C | 16 | 40 | 65 | 150 | 120 |
| Chlorine content, percent by wt | 3.0 | 4.6 | 3.8 | 4.8 | 0.8 |
| Bulk viscosity, poise at 25° C | 800 | 1,460 | 1,240 | 3,600 | 1,150 |

[1] Air was evacuated from bottle 2 and control bottle before the addition of HCl.
[2] Hydroxylated 220 poise.
[3] Non-hydroxylated (420 poise).

The above table shows that the hydroxylated polymer was chlorinated to chlorine content of 3.0–4.8% by weight. The reaction was relatively fast at the start of reaction as indicated by 3% Cl in bottle 1 reacted for 16 hours. Further addition of chlorine was rather slow, in the order of 1% Cl per 100 hours, i.e. practically the same as that for the non-hydroxylated control polymer. The initial fast rate is believed to be due to the substitution of the reactive allyl hydroxyl groups by chloride, while the subsequent slow rate of the chlorine uptake is characteristic of the addition of HCl to the double bonds of polybutadiene chains.

Bottle 2 indicated that the uptake of chlorine is more rapid in the absence of air than in its presence. It showed higher chlorine content in 40 hrs. than the polymer chlorinated in the presence of air for 65 hrs. (bottle 3) and almost as high as bottle 4 which was chlorinated for 150 hrs. Chlorination in the absence of air also resulted in a product having lower bulk viscosity for a given chlorine content. This is evident on comparison of bottles 2 and 4.

Polymer samples of bottles 1–4 and the control bottle of Table I were tested for amine vulcanizability in the following manner: a 50% solution of polymer in toluene was mixed with a 50% toluene solution of hexa-N-methylated triethylene tetramine (MTETA) in proportions ranging from 1.5 to 4.0 parts by weight MTETA per 100 parts of polymer. The mixture was poured onto a glass plate and dried for seven days at room temperature. The dried samples were then removed and their strength was tested manually. All samples except for the control sample were found to be vulcanized firm, non-tacky and elastic. Bottle 2 vulcanizates were also tested for solubility and swelling in benzene, and stress-strain behaviour in an Instron tester. Results of these tests are shown in Table II.

TABLE II.—VULCANIZATION OF POLYMER SAMPLE FROM BOTTLE 2

|  | MTETA (parts/100 parts polymer) | | | |
| --- | --- | --- | --- | --- |
|  | 1.5 | 3.0 | 4.0 | 1 4.0 |
| Tensile strength (kg./cm.$^2$) | 6.9 | 10.1 | 7.8 | 5.0 |
| Elongation (percent) | 650 | 610 | 580 | 370 |
| 100% modulus (kg./cm.$^2$) | 1.5 | 2.1 | 2.0 | 2.0 |
| 300% modulus (kg./cm.$^2$) | 2.4 | 3.6 | 3.2 | 4.0 |
| Solubility in benzene $^2$ (percent) | 36.7 | 24.7 | 28.4 | 27 |

$^1$ Compounded in the absence of toluene and vulcanized for 80 minutes at 122° C.
$^2$ 48 hours immersion.

EXAMPLE II

The hydroxylated polybutadiene of Example I was brominated with different amounts of hydrogen bromide at two temperatures. Five experiments were carried out in the following manner: 50 gms. of the polymer was mixed with 100 gms. of benzene in 30 oz. bottles and a 4% by weight solution of dry hydrogen bromide in benzene was then added to each bottle in a proportion ranging from 4 to 12 parts by weight of HBr per 100 parts of polymer. Bottles were capped and agitated on a shaker for 65 hours at room temperature, except for one which was agitated for 1½ hours at 93° C. The brominated product was subjected to distillation whereby benzene and HBr were removed. More benzene was added when necessary to remove traces of residual hydrogen bromide, the presence of which was tested by the addition of AgNO$_3$ to the distillate.

The brominated polymer was then tested for vulcanizability with amine in the manner described in Example I. The results are presented in Table III.

of 16 to 20 kg./cm.$^2$ which is relatively high for low molecular weight polymers and approximately equal to that of sulfur vulcanized gum compounds of high molecular weight amorphous synthetic polymers.

It is also noted that the viscosity of brominated polymers is not as high as that of the chlorinated polymers shown in Example I.

What is claimed is:

1. A process of producing an amine-vulcanizable polymer which consists of halogenating at a temperature of about 0° C. to about 120° C. a liquid polyunsaturated polymer containing 50–100 mole percent of conjugated alkadiene units with about 4–30 parts per 100 parts of polymer of a hydrogen halide, said polymer being prepared by polymerization in an organic medium using a peroxy initiator and having a molecular weight in the order of about 1,000 to about 20,000, a major portion of the molecules of said polymer having at least two allyl hydroxy groups in terminal positions, and recovering a halogenated amine-vulcanizable liquid polyunsaturated polymer containing molecules with at least two allyl halide groups in a major proportion.

2. The process according to claim 1 in which the alkadiene is butadiene-1,3.

3. The process according to claim 1 in which the liquid polymer is halogenated under substantially water-free, oxygen-free conditions in the presence of a solvent selected from an alkane and an aromatic hydrocarbon.

4. The process according to claim 1 in which the liquid polymer is halogenated with a dry hydrogen halide at a pressure of not above 3 atmospheres.

5. The process according to claim 4 in which the hydrogen halide is hydrogen chloride.

6. The process according to claim 1 in which the hydrogen halide is hydrogen bromide.

7. The process according to claim 1 in which the recovered halogenated polymer contains from more than 2 to about 8% by weight of bound halogen.

8. The process according to claim 1 in which the recovered polymer is mixed with betwen 1 and 5 parts by weight per 100 parts of polymer of a polyfunctional vulcanizing agent to produce a solid vulcanized rubber, said polyfunctional vulcanizing agent being selected from an aliphatic amine and an aromatic amine.

9. The process according to claim 8 in which the polyfunctional vulcanizing agent is a tertiary aliphatic amine containing more than two amine nitrogen atoms.

10. The process according to claim 1 in which the liquid polymer is halogenated by reaction of a hydrogen halide

TABLE III

| Sample | 1 | 2 | 3 | 4 | 5 |
| --- | --- | --- | --- | --- | --- |
| Reaction temperature (°C.) | 25 | 25 | 25 | 25 | 93 |
| Reaction time (hrs.) | 65 | 65 | 65 | 65 | 1½ |
| Amount of HBr (parts by weight per 100 parts of polymer) | 4 | 7 | 10 | 12 | 10 |
| Bromine content (percent by wt.) | 2.0 | 4.0 | ($^1$) | 6.7 | ($^1$) |
| Bulk viscosity (poise at 25° C.) (properties of MTETA vulcanizates) | 380 | 375 | ($^1$) | 485 | 470 |
| Tensile strength (kg./cm.$^2$) | 6 | 16 | 20 | 20 | 19 |
| Elongation (percent) | 780 | 430 | 400 | 410 | 500 |
| 100% modulus (kg./cm.$^2$) | 1 | 5 | 4 | 7 | 5 |
| 300% modulus (kg./cm.$^2$) | 1.5 | 10 | 13 | 17 | 9 |
| Solubility in benzene (percent) (48 hours immersion) | 41.2 | 12.1 | 9.7 | 10.3 | 16.5 |
| Optimum MTETA (pts./100 pts. polymer) | 1.5 | 3.0 | 3.0 | 3.0 | 4.0 |

$^1$ Not tested.

All samples produced solid, elastic products on curing. With the exception of Sample 1, they all were about 90% insoluble in benzene and showed a tensile strength at a temperature preferably of about 20° C. to about 90° C. for a time sufficient for the polymer to contain at least 0.5 weight percent of bound halogen by applying a gaseous hydrogen halide at presures up to about 5 atmospheres.

References Cited

UNITED STATES PATENTS 3,135,716  6/1964  Uraneck _____ 260—94.7X

FOREIGN PATENTS 1,282,760  1962  France _____ 260—94.2

OTHER REFERENCES

Organic Chemistry by Fieser & Fieser (second edition) 1950, pp. 149–150.

Some Fundamental Aspects of Polymer Reaction by I. Sakurada, Macro Molecular Chemistry, 4 papers of International Symposium on Macromolecular Chemistry, Dec. 16, 1967. p. 263.

JOSEPH L. SCHOFER, Primary Examiner

W. F. HAMROCK, Assistant Examiner

U.S. Cl. X.R.

260—83.3, 83.5, 82.1, 96, 654